United States Patent [19]

Harris

[11] Patent Number: 5,557,452
[45] Date of Patent: Sep. 17, 1996

[54] CONFOCAL MICROSCOPE SYSTEM

[75] Inventor: David W. Harris, Pearl City, Hi.

[73] Assignee: University of Hawaii, Honolulu, Hi.

[21] Appl. No.: 384,654

[22] Filed: Feb. 6, 1995

[51] Int. Cl.$^6$ .................... G02B 26/08; G02B 21/00; G01B 5/00; G01B 11/02

[52] U.S. Cl. .................... 359/368; 359/196; 359/384; 359/224; 250/306; 250/307; 356/384

[58] Field of Search .................... 359/379, 391, 359/368, 389, 384, 392, 224; 250/306, 307, 309, 310, 311

[56] References Cited

U.S. PATENT DOCUMENTS

| | | | |
|---|---|---|---|
| 2,971,054 | 1/1961 | Holt, Jr. | 178/7.6 |
| 3,013,467 | 12/1961 | Minsky | 88/14 |
| 3,525,873 | 8/1970 | Nomarski et al. | 250/235 |
| 4,170,397 | 10/1979 | Botcherby et al. | 350/6.3 |
| 4,520,570 | 6/1985 | Bednorz et al. | 33/180 |
| 4,708,420 | 11/1987 | Liddiard | 350/6.6 |
| 4,863,252 | 9/1989 | McCarthy et al. | 350/507 |
| 5,018,865 | 5/1991 | Ferrell et al. | 250/306 |
| 5,107,365 | 4/1992 | Ota | 359/213 |
| 5,161,053 | 11/1992 | Dabbs | 359/384 |
| 5,212,580 | 5/1993 | Coad et al. | 359/379 |
| 5,298,975 | 3/1994 | Khowry et al. | 250/306 |

FOREIGN PATENT DOCUMENTS

| | | | |
|---|---|---|---|
| 3-120509 | 5/1991 | Japan | G02B 26/10 |
| 742853 | 6/1980 | U.S.S.R. | G02F 1/29 |
| 1446-587A | 12/1986 | U.S.S.R. | G02B 26/10 |
| 1405-015A | 6/1988 | U.S.S.R. | G02B 26/10 |
| 1476-422A | 4/1989 | U.S.S.R. | G02B 26/10 |
| 1485-188A | 6/1989 | U.S.S.R. | G02B 26/10 |
| WO85/05464 | 12/1985 | WIPO | G02B 26/10 |

OTHER PUBLICATIONS

D. K. Hamilton et al., "Scanning Optical Microscopy by Objective Lens Scanning," *J. Phys. Ed.*, 19:52–54 (1986).

S. R. Goldstein et al., "A Confocal Video–Rate Laser–Beam Scanning Reflected–Light Microscope With No Moving Parts," Journal of Microscopy, vol. 157, pp. 29–38 (1990).

*Primary Examiner*—Paul M. Dzierzynski
*Assistant Examiner*—Mohammad Y. Sikder
*Attorney, Agent, or Firm*—Fish & Richardson P.C.

[57] ABSTRACT

The present invention includes a confocal microscope having a piezoelectric bimorph cell x-y beam scanner. A single-mode optical fiber is used both to transmit the illuminating beam and to collect reflected or stimulated radiation. Image manipulation may be performed remotely from the sample area.

8 Claims, 5 Drawing Sheets

SCAN LINE PATTERN

CONFOCAL MICROSCOPE SYSTEM

BACKGROUND OF THE INVENTION

The present invention relates generally to confocal microscopy, and more particularly to a confocal microscope which incorporates piezoelectric bimorph cells to scan an objective image plane.

The principle of confocal microscopy was first taught by M. Minsky in the mid 1950s, and is described in Minsky's U.S. Pat. No. 3,013,467. In this well known technique, light from a point source is used to illuminate a very small region of a sample object, and a point detector is used to detect light reflected from that small area. By limiting the spatial dimension of the detector, images with resolution better than the classical diffraction limit may be obtained. An image of the sample object is formed one point at a time by synchronously scanning the light source and the detector, much in the same way that a scanned television image is formed one pixel at a time.

Confocal microscopy has many advantages over standard optical microscopy. For example, confocal microscopy allows for optical sectioning (i.e., depth discrimination) of translucent specimens, and provides excellent images of the surface topology of reflective opaque specimens. In addition, a confocal microscope has a horizontal resolution up to 1.4 times that of a conventional microscope, and can screen out fogginess normally observed with standard microscopes used on living specimens.

In a more specific technique known as Scanning Confocal Fluorescence Laser Microscopy (SCFLM), the illuminating beam is used to stimulate fluorescence in a sample object. The light emitted by the fluorescing sample is detected and used to form an image in the same manner as described above. SCFLM is especially useful in generating three-dimensional images of biological specimens.

There have been several scanning techniques and systems used in confocal microscope imaging. One such technique is to mechanically raster a specimen relative to the light source. This technique allows a very simple optical system to be used, and also gives space-invariant imaging. Space-invariant imaging ensures that resolution and contrast are identical across the entire field of view, and are completely decoupled from magnification. However, this technique results in relatively slow image acquisition, typically on the order of a few seconds. Also, this technique is not practical in situations where the specimen cannot be moved in a tightly controlled manner.

Previous techniques for scanning a light beam relative to a stationary sample include the use of vibrating galvanometer-type mirrors or rotating mirror wheels. In addition, an acousto-optic beam deflector technique has been described by S. Goldstein in "A No-Moving-Parts Video Rate Laser Beam Scanning Type 2 Confocal Reflected-Transmission Microscope," J. Microsc., 153, RP1-RP2. The use of the latter two alternatives gives the possibility of television rate scanning, whereas vibrating mirror systems are usually relatively slow. The drawbacks to these techniques lie in the increased complexity of the optical system, the added expense, and the non-space-invariant imaging.

Yet another scanning technique is described by D. K. Hamilton and T. Wilson in "Scanning Optical Microscopy by Objective Lens Scanning," J. Phys. E., 19, 52–54 (1986). In this technique, the objective lens is itself scanned relative to a stationary optical system and a stationary object.

While each of the above described scanning techniques is useful in certain circumstances, each of these techniques has serious drawbacks in that they are expensive, relatively fragile, and not suitable for use outside of a laboratory setting.

SUMMARY OF THE INVENTION

Accordingly, an object of the present invention is to provide a relatively inexpensive confocal microscope scanning system which is also rugged and compact.

It is another object of the present invention to provide a rugged, remotely operable confocal microscope suitable for use outside of a laboratory environment.

The present invention includes a confocal microscope having a piezoelectric bimorph cell x-y beam scanner. A single-mode optical fiber is used both to transmit the illuminating beam and to collect reflected or stimulated radiation. Image manipulation may be performed remotely from the sample area.

Additional objects and advantages of the invention will be set forth in part in the description which follows, and in part become apparent to those skilled in the art upon examination of the following, or may be learned by practice of the invention. The objects and advantages of the invention may be realized and obtained by means of the instrumentalities and combinations particularly pointed out in the claims.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, which is a confocal microscope system. Examples of the invention are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1A:
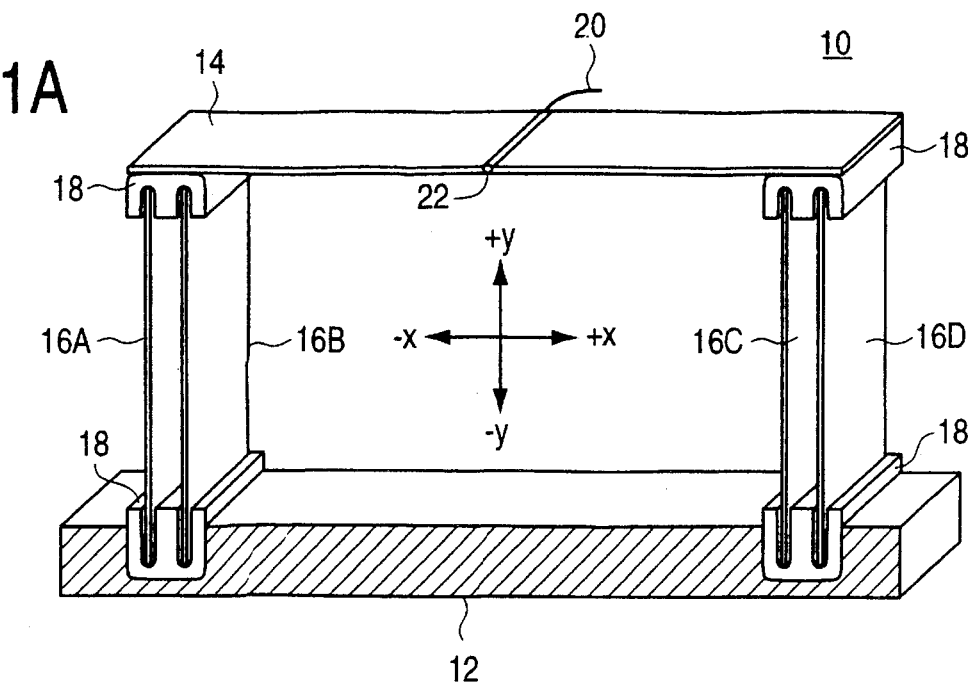
FIG. 1A is a perspective view of a piezoelectric bimorph cell x-y scanner according to the present invention.

Referring now to FIG. 1A, a piezoelectric bimorph cell x-y scanner 10.according to the present invention is shown. Scanner 10 includes a rigid base 12, a fast scan piezoelectric bimorph cell 14, four slow scan piezoelectric bimorph cells 16A–16D, and a plurality of flexible connectors 18. Fast scan bimorph cell 14 is mounted parallel to rigid base 12, and perpendicular to slow scan bimorph cells 16A–16D. Connectors 18 connect base 12, fast scan bimorph cell 14 and slow scan bimorph cells 16A–16D together as shown in FIG. 1A.

Piezoelectric bimorph cells are commonly used in the audio industry. These cells include two piezoelectric plates connected together in such a way that an applied voltage causes one to expand and the other to contract so that the cell bends in proportion to the applied voltage.

A single mode optical fiber 20 is mounted perpendicular to the longitudinal axis of fast scan bimorph cell 14', approximately half way between slow scan bimorph cells 16B and 16C. Optical fiber 20 has an end 22 that is used both to emit light for sample illumination, and to collect light reflected or emitted from a sample. As will be described more fully below, the function of scanner 10 is to scan end 22 of optical fiber 20 in a predetermined pattern across the image plane of a microscope objective.

Figure 1B:
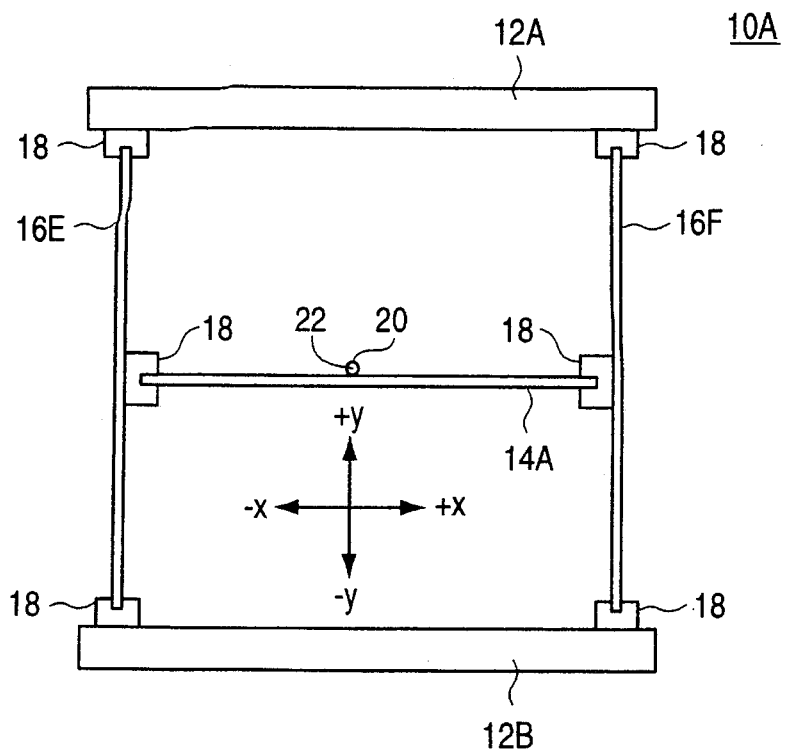
FIG. 1B is a cross sectional view of a piezoelectric bimorph cell x-y scanner according to an alternative embodiment of the present invention.

Referring now to FIG. 1B, a cross sectional view of an alternative embodiment of the present invention is shown. In this embodiment, piezoelectric bimorph cell x-y scanner 10A includes two rigid bases 12A and 12B. Slow scan piezoelectric bimorph cells 16E and 16F are mounted perpendicularly to rigid bases 12A and 12B with flexible connectors 18. Fast scan piezoelectric bimorph cell 14A is mounted perpendicular to and in between slow scan bimorph cells 16E and 16F with flexible connectors 18. A single mode optical fiber 20 is mounted perpendicular to the longitudinal axis of fast scan bimorph cell 14A, approximately half way between slow scan bimorph cells 16E and 16F.

Referring now to FIGS. 1A and 1B, fast scan piezoelectric bimorph cells 14 and 14A bend in the positive or negative y direction when a predetermined voltage is applied. This causes end 22 of fiber 20 to scan in the positive or negative y direction. Similarly, slow scan bimorph cells 16A 16D and 16E–16F bend in the positive or negative x direction when a predetermined voltage is applied, causing end 22 of fiber 20 to move in the positive or negative x direction. The x and y directions are defined by labelled axes found in FIGS. 1A and 1B.

Figure 5:
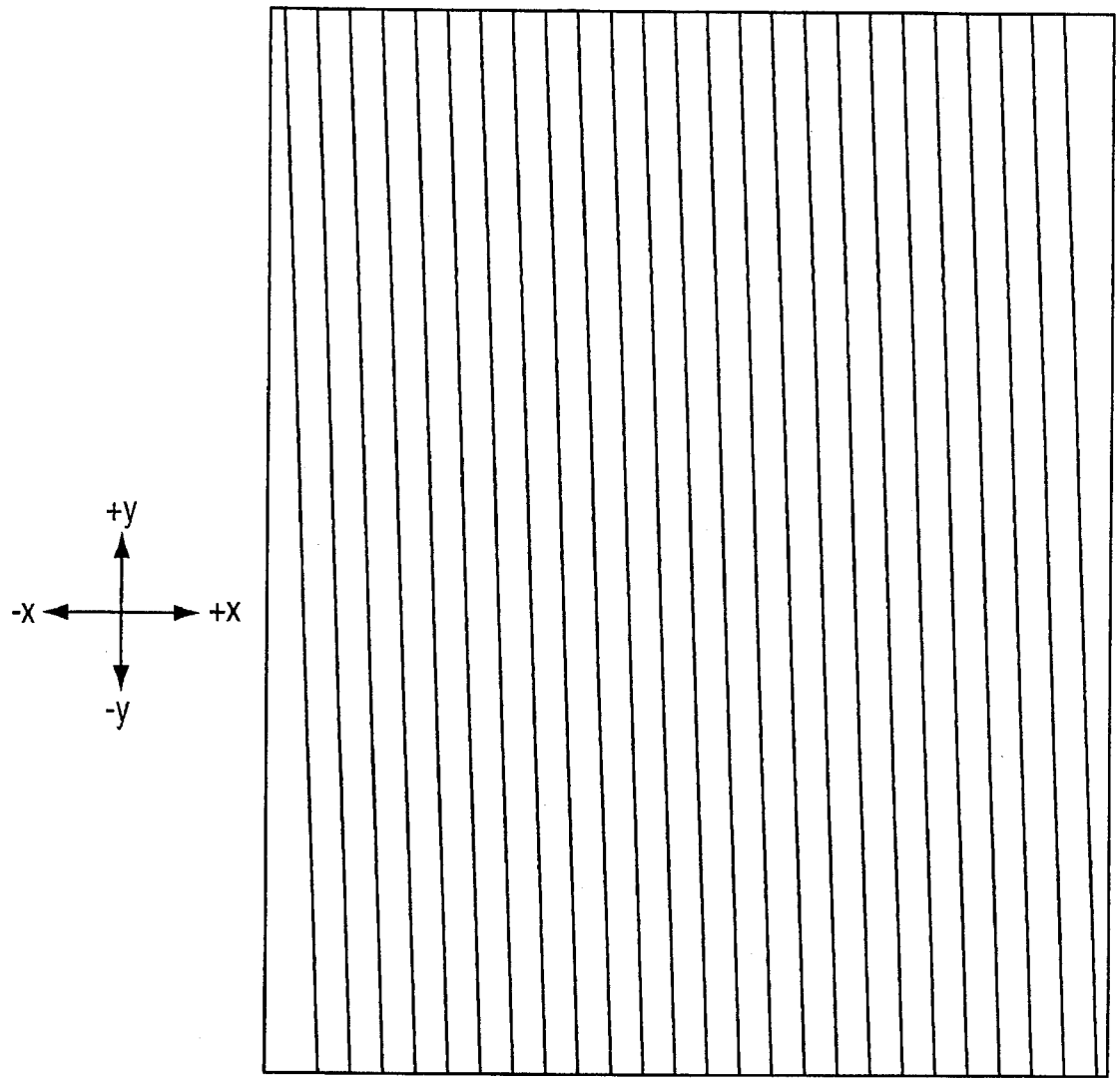
FIG. 5 is schematic representation showing how a raster scanned image is formed from a plurality of scan lines.

A scan line is defined by motion of end 22 along the full range of deflection possible in the positive and negative y directions. Subsequent scan lines are created by moving end 22 in the x direction and repeating the above described motion in the y direction. An image is formed by combining all of the scan lines into a single frame, similar to that shown in FIG. 5. The number of scan lines used depends on the level of detail required, and several other factors known to those skilled in the art. Additional images can be formed by repeating the scanning process.

Figure 2:
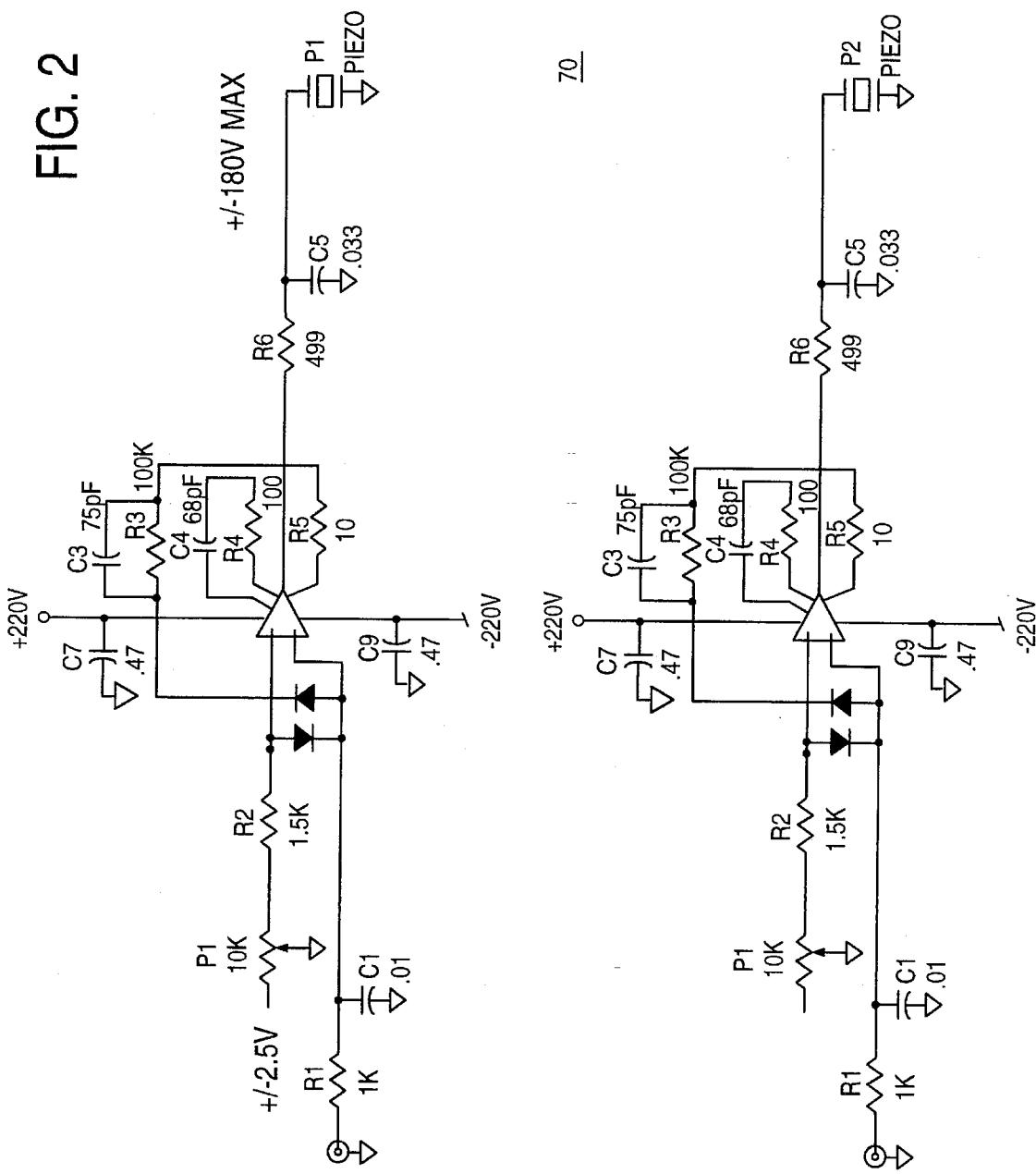
FIG. 2 is a circuit diagram showing the driving electronics for the scanner of FIG. 1A.

Referring now to FIG. 2, a schematic diagram showing the driving electronics 70 for scanner 10 is shown. Driving electronics 70 are preferably based on the PA 88 amplifier, manufactured by Apex Microtechnology Corp. of Tucson, Ariz. The driving electronics essentially generate a sawtooth waveform for the fast scan bimorph cells 14, and a lower frequency sawtooth waveform for the slow scan bimorph cells 16. These waveforms cause bimorph cells 14 and 16 to scan as described above. It will be apparent to those skilled in the art that the configuration shown in FIG. 2 is only one of many that can be used to create the appropriate waveforms needed to control bimorph cells 14 and 16.

Figure 3:
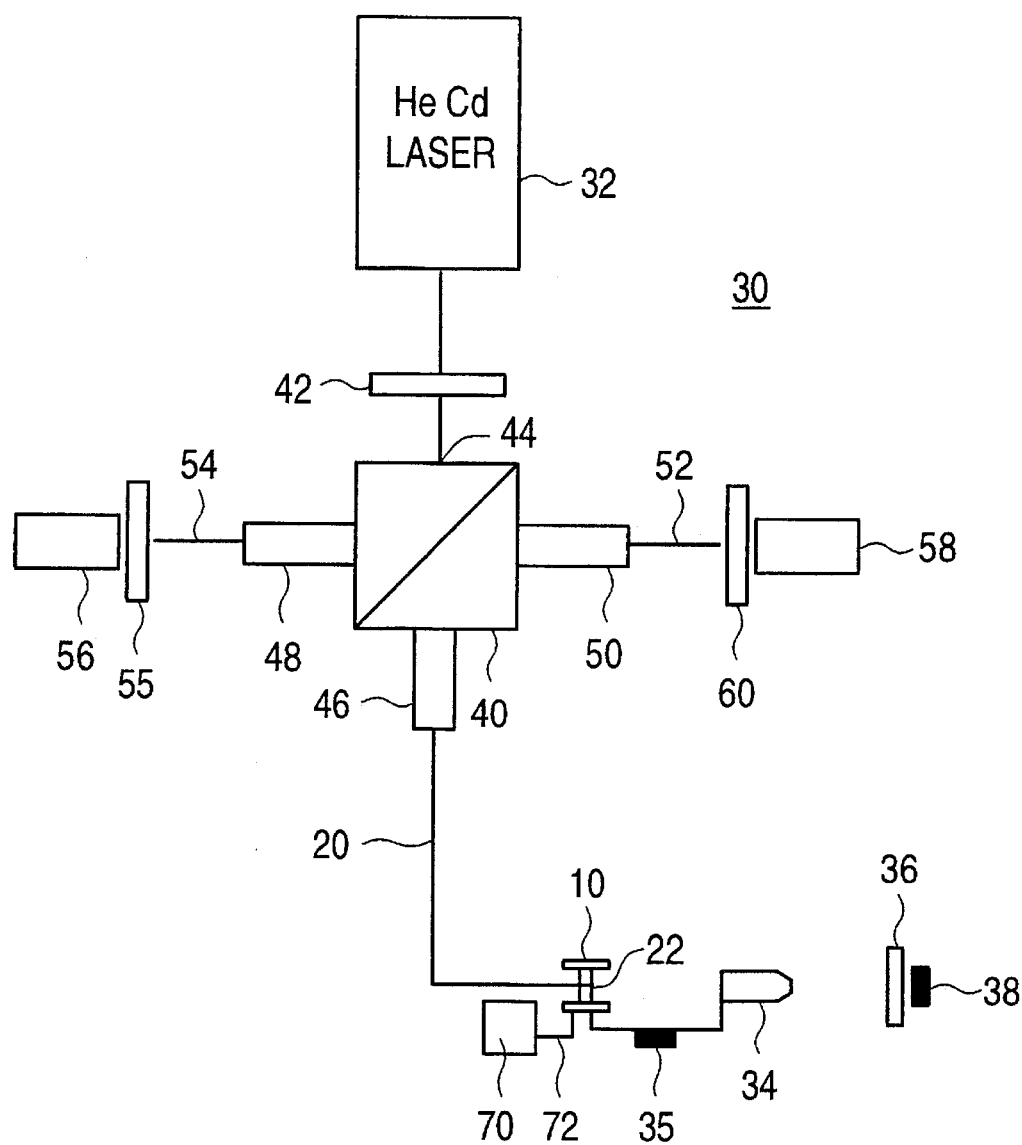
FIG. 3 is a schematic diagram of a submersible confocal microscope incorporating the scanner of FIG. 1A.

Since scanner 10 is made of piezoelectric bimorph cells 14 and 16, it can be manufactured to be inexpensive, rugged, and compact. These qualities make it suitable for use in a laboratory setting. However, these qualities also make scanner 10 especially useful in more hostile environments where conventional scanning techniques would be impractical or impossible. One device suited for the above described scanner 10 is a submersible scanning confocal fluorescence laser microscope 30 as shown in FIG. 3. Such a microscope might be used generally to study materials in the deep ocean, and more specifically to measure the biodegradability of polymers found in landfills and ocean disposal sights.

In microscope 30, light is generated by a helium cadmium (He Cd) laser 32. Laser 32 preferably emits blue light with a wavelength of approximately 442 nm. Due to the severe attenuation of blue light in optical fibers, it is necessary for laser 32 to be in close proximity to the rest of the optics within microscope 30.

Light exiting He Cd laser 32 typically has a beamwidth of approximately 0.8 mm and a beam divergence of approximately 1.9 mrad. This light passes through a narrow bandpass filter 42, resulting in a spectrally pure beam having a $\Delta\lambda$ of 8 nm full width half maximum (FWHM). Such filters are produced by Oriel Corp. of Stamford, Conn. Filter 42 is needed to eliminate the broadband plasma tube glow emitted by the tube (not shown) of laser 32.

Light exiting filter 42 is next directed into input port 44 of 50/50 beamsplitter 40. Approximately fifty percent of the light entering port 44 is coupled into a 200 micron core quartz fiber 54 via exit port 48 of beamsplitter 40. Exit port 48 is preferably includes a GRIN lens.

Light exiting fiber 54 is attenuated by filter 55, and detected by a photomultiplier tube (PMT) 56. PMT 56 is used to monitor intensity fluctuations of laser 32, which allows for normalization of the sample fluorescence signal (to be described below).

Approximately fifty percent of the light entering input port 44 is coupled into single mode optical fiber 20 via exit port 46 of beamsplitter 40. Exit port 46 preferably includes a GRIN lens.

Fiber 20 terminates on scanner 10, which is in the image plane of a microscope objective 34. In a preferred embodiment, microscope objective 34 has a magnification of 10 X.

Focussing may be achieved by moving scanner 10 in the positive or negative z direction relative to objective 34 using z stage 35. Driving electronics 70 are coupled to scanner 10 via control lines 72.

Light radiating from end 22 of fiber 20 is focussed by microscope objective 34, and is transmitted through a transparent sapphire window 36. Window 36 acts as an optically flat pressure port which delivers light to a semi-transparent sample 38 which is exposed to the external environment. After passing through window 36, the laser light comes to a focus inside sample 38, causing it to fluoresce. The area of the light spot within sample 38 is on the order of 0.5 $\mu m^2$.

A fraction of the fluorescent light radiated by sample 38 passes through window 36 and into the solid angle defined by microscope objective 34. This light is reimaged onto end 22, coupled into optical fiber 20, and guided back to port 46 of beam splitter 40. Exit port 50 receives approximately fifty percent of the returning fluorescent light, which is then coupled into a quartz optical fiber 52. Exit port 50 preferably includes a GRIN lens.

Light exiting fiber 52 is filtered by a low fluorescence, long-pass filter 60, such as a Chroma 525R filter. Filter 60 preferably has an extinction of 60 db at the laser wavelength of 442 nm, and a 50% transmission point at 525 nm.

Light exiting filter 60 is then directed to and detected by a PMT 58. Signals generated by PMT 58 (representative of the intensity of fluorescent light radiated by sample 38) and PMT 56 (representative of the intensity of laser 32) can be digitized and manipulated to form images using methods and systems well known to those skilled in the art. For example, digitized signals from PMTs 58 and 56 may be transmitted via fiber optic cables to a personal computer where an image can be assembled and manipulated.

Figure 4:
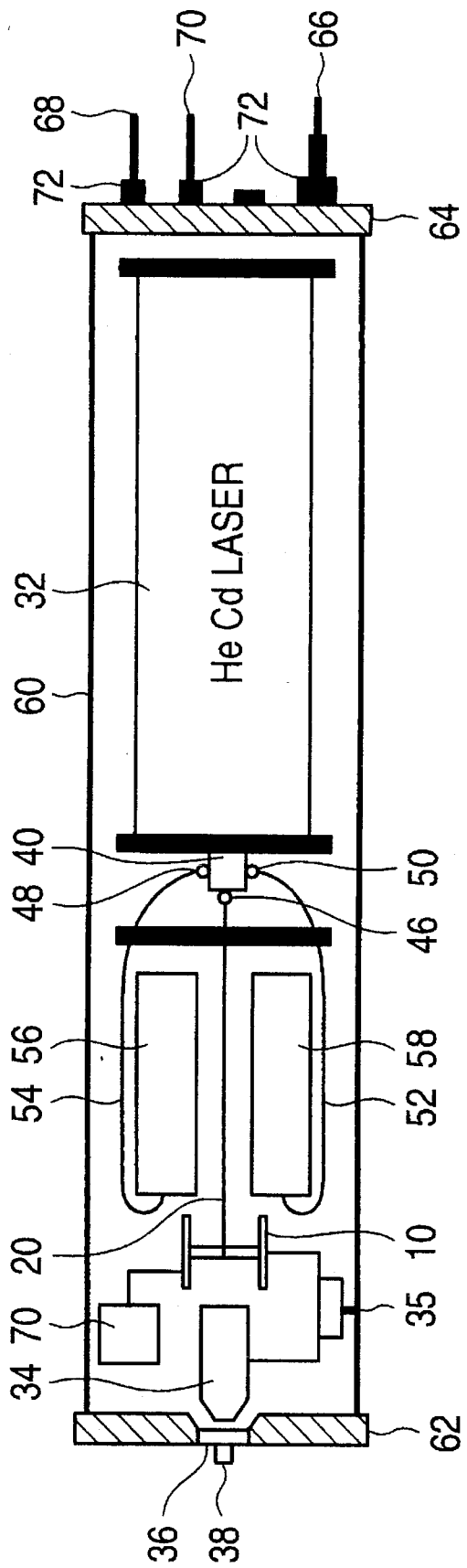
FIG. 4 is a cross sectional view of the submersible confocal microscope shown in FIG. 3.

Referring now to FIG. 4, a cross sectional view of microscope 30 enclosed in a pressure casing 60 is shown. In a preferred embodiment, pressure casing 60 is a water tight, aluminum cylinder with endcaps 62 and 64.

Window 36 is mounted in endcap 62. Power is supplied to microscope 30 via power cable 66, and data and commands are transferred to and from microscope 30 via fiber optic cables 68 and 70. Cables 66, 68, and 70 enter pressure casing 60 via high pressure feedthroughs 72 in endcap 64.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A confocal microscope scanning device comprising:

a first piezoelectric bimorph cell having a first end, a second end, a first flat side, and a second flat side;

a second piezoelectric bimorph cell having a first end and a second end;

a third piezoelectric bimorph cell having a first and a second end;

means for flexibly mounting said first end of said first piezoelectric bimorph cell perpendicularly to said first end of said second piezoelectric bimorph cell;

means for flexibly mounting said second end of said first piezoelectric bimorph cell perpendicularly to said first end of said third piezoelectric bimorph cell;

a rigid base;

means for flexibly mounting said second end of said second piezoelectric bimorph cell and said second end of said third piezoelectric bimorph cell to said rigid base;

a light source;

a light detector;

an optical fiber having a first end for emitting and receiving radiation, and a second end optically coupled to said light source and said light detector;

said optical fiber mounted on said first flat side of said first piezoelectric bimorph cell so that said first end of said optical fiber points in a direction perpendicular to the longitudinal axis of said first piezoelectric bimorph cell;

means for generating a first voltage waveform signal of a first frequency, and for generating a second voltage waveform signal of a second frequency; and means for coupling said first waveform signal to said first piezoelectric bimorph cell, and for coupling said second waveform signal to said second and said third piezoelectric bimorph cells, whereby said end is deflected in a raster scan pattern.

2. The scanning device of claim 1 further including:

a fourth piezoelectric bimorph cell having a first end and a second end;

a fifth piezoelectric bimorph cell having a first end and a second end;

means for flexibly mounting said first end of said fourth piezoelectric bimorph cell perpendicularly to said second flat side of said first piezoelectric bimorph cell and juxtaposed to said second piezoelectric bimorph cell;

means for flexibly mounting said first end of said fifth piezoelectric bimorph cell perpendicularly to said second flat side of said first piezoelectric bimorph cell and juxtaposed to said third piezoelectric bimorph cell; and means for coupling said second waveform signal to said fourth and said fifth piezoelectric bimorph cells.

3. A confocal microscope scanning device comprising:

a first piezoelectric bimorph cell having a first end, a second end, a first flat side, and a second flat side;

a second piezoelectric bimorph cell having a first end, a second end, a first flat side, and a second flat side;

means for flexibly mounting said first end of said first piezoelectric bimorph cell perpendicularly to said first flat side of said second piezoelectric bimorph cell, midway between said first end and said second end of said second piezoelectric bimorph cell;

means for flexibly mounting said first end of said first piezoelectric bimorph cell perpendicularly to said first flat side of said third piezoelectric bimorph cell, midway between said first end and said third end of said second piezoelectric bimorph cell;

a rigid base;

means for flexibly mounting said second end of said second piezoelectric bimorph cell and said second end of said third piezoelectric bimorph cell to said rigid base;

a light source;

a light detector;

an optical fiber having a first end for emitting and receiving radiation, and a second end optically coupled to said light source and said light detector;

said optical fiber mounted on said first flat side of said first piezoelectric bimorph cell so that said first end of said optical fiber points in a direction perpendicular to the longitudinal axis of said first piezoelectric bimorph cell;

means for generating a first voltage waveform signal of a first frequency, and for generating a second voltage waveform signal of a second frequency; and means for coupling said first waveform signal to said first piezoelectric bimorph cell, and for coupling said second waveform signal to said second and said third piezoelectric bimorph cells, wherein said end is deflected in a raster scan pattern.

4. A portable submersible confocal microscope comprising:

a water tight container having a transparent window;

a microscope objective slidably mounted inside said container next to said window, said microscope objective having an image plane inside said container;

a light source mounted inside said container for generating light used to stimulate fluorescence in a sample to be studied;

a light detector mounted inside said container for detecting said fluorescence stimulated in said sample;

an optical fiber having a first end for emitting and receiving radiation, and a second end optically coupled to said light source and said light detector;

means for coupling said light source and said light detector to said second end of said optical fiber;

a piezoelectric positioner mounted inside said container, said positioner including a first piezoelectric bimorph cell having a first end, a second end, a first flat side, and a second flat side, a second piezoelectric bimorph cell having a first end and a second end, a third piezoelectric bimorph cell having a first and a second end, means for flexibly mounting said first end of said first piezoelectric bimorph cell perpendicularly to said first end of said second piezoelectric bimorph cell, means for flexibly mounting said second end of said first piezoelectric bimorph cell perpendicularly to said first end of said third piezoelectric bimorph cell, a rigid base mounted in said container, and means for flexibly mounting said second end of said second piezoelectric bimorph cell and said second end of said third piezoelectric bimorph cell to said rigid base, said optical fiber mounted on said first flat side of said first piezoelectric bimorph cell so that said first end of said optical fiber points in a direction perpendicular to the longitudinal axis of said first piezoelectric bimorph cell, and so that said first end of said optical fiber is in said image plane of said microscope objective.

5. The microscope of claim 4 further including means for measuring the intensity of the light emitted by said light source.

6. The microscope of claim 4 wherein said light source is a laser.

7. The microscope of claim 4 wherein said light detection is a photomultiplier tube.

8. The microscope of claim 4 wherein said means for coupling is a beamsplitter.

* * * * *